(12) United States Patent
Wu et al.

(10) Patent No.: US 7,824,288 B2
(45) Date of Patent: Nov. 2, 2010

(54) POLYURETHANE POWER TRANSMISSION BELT

(75) Inventors: William Wu, Elizabethtown, KY (US); Joseph R. Duke, Elizabethtown, KY (US); James R. Stamp, Elizabethtown, KY (US); Harry D. Visser, Lakewood, CO (US)

(73) Assignee: The Gates Corporation, Denver, CO (US)

( * ) Notice: Subject to any disclaimer, the term of this patent is extended or adjusted under 35 U.S.C. 154(b) by 482 days.

(21) Appl. No.: 12/044,957

(22) Filed: Mar. 8, 2008

(65) Prior Publication Data

US 2009/0227406 A1  Sep. 10, 2009

(51) Int. Cl.
*F16G 5/00* (2006.01)
(52) U.S. Cl. ..................................... 474/268
(58) Field of Classification Search ............... 474/268, 474/263, 264, 266, 271, 143, 207; 524/496; 104/88
See application file for complete search history.

(56) References Cited

U.S. PATENT DOCUMENTS

| | | | |
|---|---|---|---|
| 3,138,962 A | 6/1964 | Haines, Jr. et al. | |
| 3,656,360 A * | 4/1972 | Fix | 474/250 |
| 4,695,602 A * | 9/1987 | Crosby et al. | 524/439 |
| 4,766,167 A | 8/1988 | Marnett et al. | |
| 5,112,282 A * | 5/1992 | Patterson | 474/260 |
| 5,807,194 A | 9/1998 | Knutson et al. | |
| 5,907,014 A | 5/1999 | Quint | |
| 6,227,249 B1 | 5/2001 | Akedo et al. | |
| 6,296,588 B1 | 10/2001 | Ciemniecki et al. | |
| 6,306,375 B1 | 10/2001 | Ellingson et al. | |
| 6,405,775 B1 | 6/2002 | Maly et al. | |
| 6,656,073 B1 * | 12/2003 | Di Meco et al. | 474/267 |
| 6,821,588 B1 | 11/2004 | Hammer et al. | |
| 6,964,626 B1 * | 11/2005 | Wu et al. | 474/260 |
| 7,025,699 B2 * | 4/2006 | Beck | 474/260 |
| 7,056,249 B1 * | 6/2006 | Osako et al. | 474/260 |
| 7,235,028 B2 * | 6/2007 | Martin et al. | 474/264 |
| 2005/0256288 A1 | 11/2005 | Rosenberg et al. | |
| 2006/0199911 A1 | 9/2006 | Markovich et al. | |
| 2006/0241273 A1 | 10/2006 | Bojkova et al. | |
| 2007/0100112 A1 | 5/2007 | Sarpeshkar et al. | |

OTHER PUBLICATIONS

International Search Report and Written Opinion, PCT/US2009/001438, Jul. 13, 2009.
The Hall Star Company, Plasticizer/Polymer Polarity Chart, Technical Publication.

* cited by examiner

*Primary Examiner*—Emmanuel M Marcelo
(74) *Attorney, Agent, or Firm*—P. N. Dunlap, Esq.; J. A. Thurnau, Esq.

(57) ABSTRACT

A power transmission belt having a main belt body portion of elastomeric material, a tensile reinforcement such as carbon fiber cord, disposed in said body portion, and a sheave contact portion integral with said main body portion. The elastomeric material includes the reaction product of a polyisocyanate prepolymer composition and a chain extender. The polyisocyanate prepolymer composition is prepared by reacting a diisocyanate and a polyol substantially free of moieties oxidative at less than about 150° C. and at least one triol crosslinker selected from the same group of polyols. Either before or after reacting the prepolymer, a plasticizer selected from the group consisting of alkyl-ether di-alkylesters such as polyethylene glycol di-alkylester is added thereto. The chain extender is an aromatic symmetric primary or secondary diamine chain extenders.

19 Claims, 3 Drawing Sheets

POLYURETHANE POWER TRANSMISSION BELT

BACKGROUND OF THE INVENTION

1. Field of the Invention

This invention relates generally to a textile-reinforced, elastomeric polyurethane articles for dynamic applications, more particularly to a power transmission belt with a plasticized polyurethane/urea elastomer and carbon fiber tensile cord, and specifically to an improved polyurethane/urea elastomer composition which improves flex fatigue resistance of carbon fiber tensile cord in polyurethane belts.

2. Description of the Prior Art

It is generally known that certain additives, known as plasticizers or diluents, when added to polyurethane prepolymers will reduce the viscosity of these prepolymers. Unfortunately, a simultaneous effect of these additives is to significantly reduce certain cured properties of the polyurethane elastomer such as hardness, tensile modulus, and tear strength.

U.S. Pat. No. 5,907,014 discloses polyurethane prepolymers with improved wettability without sacrificing physical properties. Prepolymers with dibasic esters, preferably aliphatic dialkyl esters where the alkyl group is $C_1$ to $C_7$, and diamine or polyol curatives are applied to one or more fabric plies and are subsequently cured at the appropriate temperature and time to create a finished product, i.e., a conveyor belt.

U.S. Pat. No. 6,964,626, the contents of which are hereby incorporated herein in its entirety, discloses improved polyurethane/urea elastomers having high temperature stability to about 140-150° C. and low temperature flexibility at about −35-(−40)° C., for use in dynamic applications. These elastomers are useful for application in belts, specifically in automotive timing or synchronous belts, V-belts, multi-V-ribbed or micro-ribbed belts, flat belting and the like. The polyurethane/urea elastomers are prepared by reacting polyisocyanate prepolymers with symmetric primary diamine chain extenders, mixtures of symmetric primary diamine chain extenders and secondary diamine chain extenders, or mixtures of symmetric primary diamine chain extenders and nonoxidative polyols, which are all chosen to eliminate the need for catalysts via standard molding processes, and to improve phase separation. The polyisocyanate prepolymers are reaction products of polyols which are nonoxidative at high temperatures, such as polycarbonate polyols, polyester polyols, or mixtures thereof, with organic polyisocyanates which are either compact, symmetric and aromatic, such as para-phenylene diisocyanate, 1,5-naphthalene diisocyanate, and 2,6-toluene diisocyanate, or are aliphatic and possess trans or trans,trans geometric structure, such as trans-1,4-cyclohexane diisocyanate and trans,trans-4,4'-dicyclohexylmethyl diisocyanate.

SUMMARY

The present invention is directed to polyurethane/urea elastomers, power transmission belts, and methods which provide improved room temperature and high-temperature flex fatigue resistance and improved dynamic load performance.

The present invention is directed to a power transmission belt having a main belt body portion of elastomeric material, a tensile reinforcement disposed in said body portion, and a sheave contact portion integral with said main body portion. The elastomeric material includes the reaction product of a polyisocyanate prepolymer composition and a chain extender. The polyisocyanate prepolymer composition is prepared by reacting (i) a diisocyanate selected from the group consisting of (a) para-phenylene diisocyanate, (b) 2,6-toluene diisocyanate, and (c) a cycloaliphatic diisocyanates with trans or trans, trans geometric structure; (ii) a polyol substantially free of moieties oxidative at less than about 150° C. and selected from the group consisting of (a) polycarbonate polyols, (b) polyester polyols, and (c) mixtures of said polycarbonate polyols and said polyester polyols; and (iii) at least one triol crosslinker selected from the above group of polyols. Either before or after reacting the polyisocyanate prepolymer composition, added there to is a plasticizer selected from the group consisting of alkyl-ether di-alkylesters, polyalkyl-ether di-alkylesters, and polyethylene glycol di-alkylesters. The chain extender is selected from the group consisting of aromatic symmetric primary diamine chain extenders, mixtures of said aromatic symmetric primary diamine chain extenders and aromatic secondary diamine chain extenders, and mixtures of one or more of said aromatic symmetric primary diamine chain extenders and one or more polyols selected from those used to make the prepolymer.

In various embodiments, the tensile reinforcement may be a carbon fiber tensile cord. Reinforcement may include a textile fabric, which may cover a surface of the belt, and may be a laminate of fabric with a polymer film.

In various embodiments, the triol content in the prepolymer may be quite high, from 2% to 100%, preferably from 5% to 35%, or from about 15% to 25% by weight based on the total polyol content. The plasticizer content in the prepolymer may be from about 5% to about 30% or from 5% to about 15% by weight based on the total prepolymer weight. The plasticizer may be polyethylene glycol di-2-ethylhexoate and may have a molecular weight in the range from 300 to about 700.

In various embodiments, the polyol may be a mixture of polycaprolactone diol of molecular weight from about 500 to about 4000, or from 1500 to 2500, and polycaprolactone triol of molecular weight from about 500 or 1000 to about 4000 or from 2500 to 3500.

The invention is also directed to a method of preparing the aforementioned polyurethane elastomer and molding an article molding an article subject to dynamic loading in use selected from the group consisting of a belt, belting, a flexible coupling sleeve, and a hose and embedding in or on a surface of said article a textile reinforcement having interstices between fibers thereof, so that the urethane penetrates at least some of the interstices before or during the molding.

The advantages of embodiments of the invention include improved pot life, mold filling rate, and other processing characteristics of the polyurethane, improved tensile cord strength retention in belt flex testing, improved hot load and flex performance, and improved belt durability.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

The present invention is directed to a power transmission belt having a main belt body portion of elastomeric material, a tensile reinforcement disposed in said body portion, and a sheave contact portion integral with said main body portion. According to the invention, the elastomeric material includes the reaction product of a plasticized, polyisocyanate prepolymer composition and a chain extender. The polyisocyanate prepolymer composition is prepared by reacting (i) a diisocyanate selected from the group consisting of (a) para-phenylene diisocyanate, (b) 2,6-toluene diisocyanate, and (c) a cycloaliphatic diisocyanates with trans or trans, trans geometric structure; (ii) a polyol substantially free of moieties oxidative at less than about 150° C. and selected from the group consisting of (a) polycarbonate polyols, (b) polyester polyols, and (c) mixtures of said polycarbonate polyols and said polyester polyols; and (iii) at least one triol crosslinker selected from the above group of polyols. Either before or after reacting the polyisocyanate prepolymer composition, added thereto is a plasticizer selected from the group consisting of alkyl-ether di-alkylesters, polyalkyl-ether di-alkylesters, and polyethylene glycol di-alkylesters. The chain extender is selected from the group consisting of aromatic symmetric primary diamine chain extenders, mixtures of said aromatic symmetric primary diamine chain extenders and aromatic secondary diamine chain extenders, and mixtures of one or more of said aromatic symmetric primary diamine chain extenders and one or more polyols selected from those used to make the prepolymer.

Figure 1:
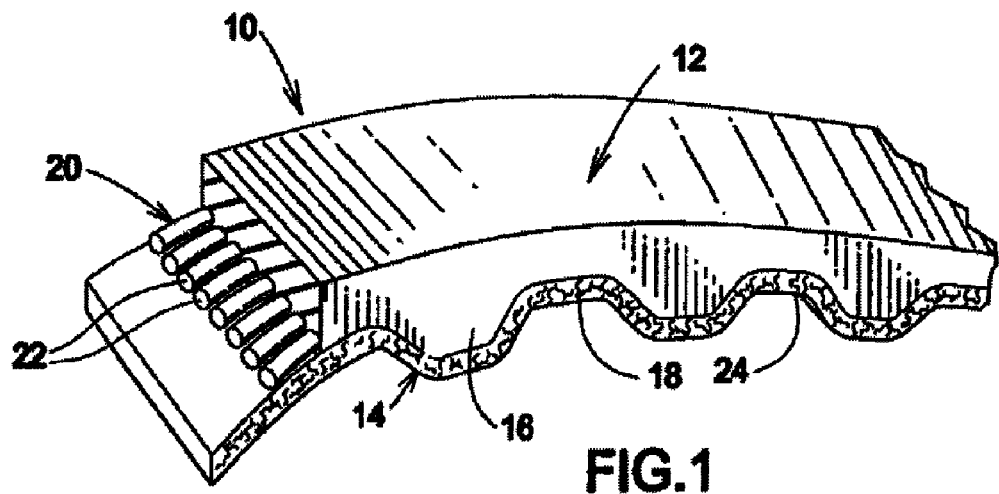
FIG. 1 is a fragmented perspective view, with parts in section, of a timing belt constructed in accordance with an embodiment of the present invention.

Referring to FIG. 1, a typical timing belt 10 is illustrated. Belt 10 includes elastomeric main body portion 12 and sheave contact portion 14 positioned along the inner periphery of main body portion 12. This particular sheave contact portion 14 is in the form of alternating transverse teeth 16 and land portions 18 which are designed to mesh with a transverse-grooved pulley or sprocket. Tensile layer 20 is positioned within main body portion 12 for providing support and strength to belt 10. In the illustrated form, tensile layer 20 is in the form of a plurality of cords 22 aligned longitudinally along the length of main body portion 12. It should be understood that, in general, any type of tensile layer 20 known to the art may be utilized. Moreover, any desired material may be used as the tensile member, such as cotton, rayon, nylon, polyester, aramid, steel, carbon, PBO, and even discontinuous fibers oriented for low load carrying capability. In the preferred embodiment of FIG. 1, tensile layer 20 is in the form of illustrated tensile cords 22 made from carbon fiber, which preferably may be a twisted yarn of continuous carbon filaments.

Reinforcing fabric 24 may be utilized and intimately fits along the alternating teeth 16 and alternating land portions 18 of belt 10 to form a face cover or tooth cover for the sheave contact portion. This fabric may be of any desired configuration such as a conventional weave consisting of warp and weft threads at any desired angle or may consist of warp threads held together by space pick cords, or of a knitted or braided configuration, or a nonwoven, and the like. More than one ply of fabric may be employed, or combinations of different fabric types. If desired, fabric 24 may be cut on a bias so that the strands form an angle with the direction of travel of the belt. Conventional fabrics may be employed using such materials as cotton, polyester, polyamide, acrylic, aramid, polyketone, polyarylene sulfide, hemp, jute, fiberglass, and various other natural and synthetic fibers including blends or combinations thereof. In a preferred embodiment of the invention, fabric layer 24 consists of an expansible wear-resistant fabric in which at least one of the warp or weft threads is made of nylon. In the preferred form, fabric layer 24 is made from a nylon 66 stretch fabric, and presents an elastomer-free (polyurethane/urea-free) surface for engaging cooperating drive sheaves. The elastomer-free surface may include a polymeric film laminated to the fabric.

Figure 2:
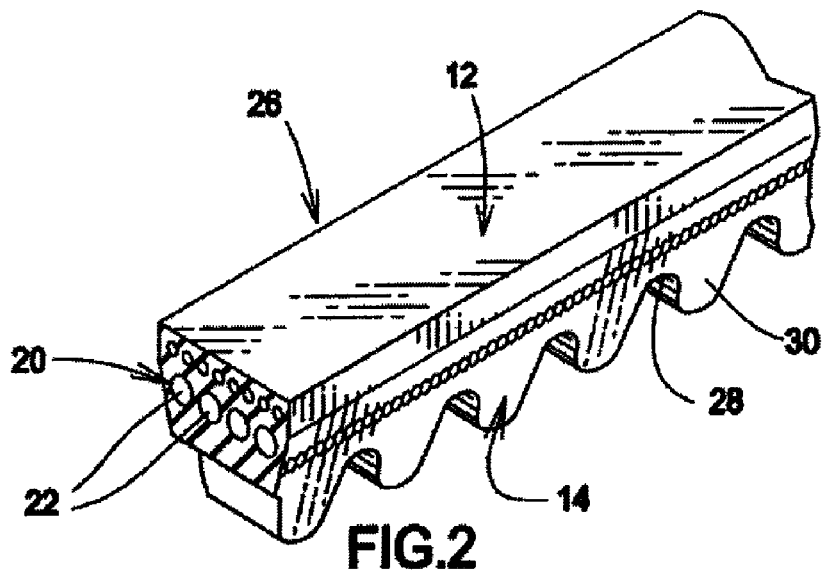
FIG. 2 is a fragmented perspective view, with parts in section, of a V-belt constructed in accordance with an embodiment of the present invention.

Referring to FIG. 2, standard notched V-belt 26 is illustrated therein. V-belt 26 includes an elastomeric body portion 12 similar to that of FIG. 1 and tensile reinforcement member 20 in the form of cords 22, also similar to that as illustrated in FIG. 1. The elastomeric body 12 and cords 22 of V-belt 26 are constructed from the same materials as described above for FIG. 1.

V-belt 26 also includes sheave contact portion 14 as in the power transmission belt of FIG. 1. In this embodiment, however, sheave contact portions 14 are the two juxtaposed sides of the belt, designed to wedge into a V-sheave. The bottom surface of V-belt 26 is in the form of alternating notch depression surfaces or troughs 28 and projections 30. These alternating notched depression surfaces 28 and projections 30 preferably follow a generally sinusoidal path as illustrated which serves to distribute and minimize bending stresses as the sheave contact portion 14 passes around pulleys and sheaves. However, troughs 28 and projections 30 are optional.

Figure 3:
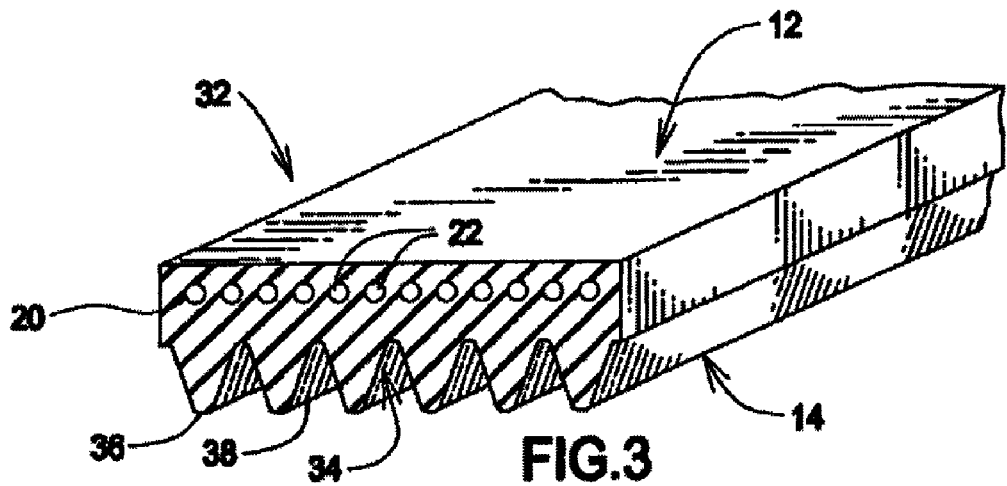
FIG. 3 is a fragmented perspective view, with parts in section, of a multi-V-ribbed belt constructed in accordance with an embodiment of the present invention.

Referring to FIG. 3, multi-V-ribbed belt 32 is illustrated. Multi-V-ribbed belt 32 includes main elastomeric body portion 12 as in the belts of FIGS. 1 and 2 and also includes tensile reinforcement member 20 preferably in the form of cords 22, also as previously described. Longitudinally grooved sheave contact portion 14 is in the form of a plurality of raised areas or apexes 36 alternating with a plurality of trough areas 38 having oppositely facing sides which define driving surfaces 34 of the belt 32. In each of these instances of FIGS. 1-3, sheave contact portion 14 is integral with main body portion 12 and formed from the same elastomeric material to be described in greater detail below. While the present invention is illustrated with reference to the embodiments shown in FIGS. 1-3, it should be understood that the present invention is not to be limited to these particular embodiments or forms as illustrated but rather is applicable to any belt construction within the scope of the claims as defined below.

The polyurethane/urea elastomers of the present invention are reaction products of plasticized polyisocyanate prepolymers with diamine chain extenders, via standard molding processes. The polyisocyanate prepolymers are reaction products of mixtures of polyols, including at least one triol, nonoxidative up to 150° C., such as polycarbonate polyols or polyester polyols, with either symmetric, compact, aromatic diisocyanates, such as PPDI, or trans- or trans,trans-geometrically configured aliphatic diisocyanates, such as trans-1,4-cyclohexane diisocyanate (t-CHDI). The presence of the triol leads to branching and/or crosslinking in the polyurethane/urea elastomer. Such crosslinking has the disadvantage of increasing the viscosity of the prepolymer and causing difficulties in processing. The addition of plasticizer to the prepolymer reduces the viscosity thereof. The addition of plasticizer may be accomplished during manufacture of the prepolymer or thereafter. The resulting crosslinked, plasticized polyurethane/urea elastomers of this invention have improved thermal stability up to about 140-150° C. and retain low temperature flexibility to about −35-(−40)° C. The thermally stable belts of the present invention, including timing or synchronous endless belts or belting, V-belts, multi-V-ribbed belts, micro-ribbed belts, flat belts or belting and the like, utilize the polyurethane/urea elastomers of this invention as their main body portion, and are manufactured using established belt fabrication methods. Unexpectedly, the belts of the present invention exhibit superior flex fatigue resistance and composite integrity compared to belts of non-plasticized and/or non-crosslinked, polyurethane/urea, even though plasticization and/or crosslinking result in certain reduced physical properties.

The present invention utilizes a two-step (prepolymer) approach via standard molding processes for preparing the polyurethane/urea elastomers. In the first step, a polyol mixture and the polyisocyanate react to yield the polyisocyanate prepolymer. In the second step, the polyisocyanate prepolymer and the chain extender react to produce the final polyurethane/urea elastomers. The plasticizer may be added to the prepolymer either before reacting the prepolymer or after the reaction. The amount of plasticizer in the prepolymer composition may be from about 5% to about 30% by weight based on the total prepolymer composition weight, preferably from 5% to about 15% by weight.

The plasticizer for the present invention may be selected from the group consisting of dialkyl-ether di-alkylesters and polyalkylene-ether di-alkylesters, such as di- or poly-ethylene glycol di-alkylesters. Dialkyl-ether diesters include $C_4$ to $C_{12}$-esters of $C_1$- to $C_4$-ether- or polyether-dicarboxylic acids. Examples of such plasticizers may include esters such as caprate, caprylate, hexanoate, heptanoate, pelargonate, 2-ethylhexoate, and the like. Examples of such plasticizers may include di-alkylesters of ethers such as ethylene glycol, propylene glycol, triethylene glycol, tetraethylene glycol, and polyethylene glycols having a molecular weight of up to about 800. A preferred plasticizer is polyethylene glycol di-2-ethylhexoate of molecular weight from about 300 to about 700. An exemplary plasticizer is PEG 400 di-2-ethylhexoate, having a molecular weight of 662 and sold under the trademark TegMeR® 809 by The HallStar Company. PEG 400 refers to a polyethylene glycol of molecular weight of about 400, or PEG with an average number of ethylene oxide units of about 8 or 9.

The organic polyisocyanates suitable for the polyisocyanate prepolymers used in the present invention are those possessing the following characteristics: compact and symmetric structure for aromatic compounds, or trans or trans,trans geometric structure for aliphatic compounds, for improved phase separation of the resulting elastomers, and high reactivity with amine groups to eliminate the need for catalysts in the formulations, which otherwise accelerate reversion of the resulting elastomers at high temperatures. The polyisocyanates useful as starting components for the preparation of the polyisocyanate prepolymers include but are not limited to compact, symmetric aromatic diisocyanates, including but not limited to PPDI, 1,5-naphthalene diisocyanate (NDI), and 2,6-toluene diisocyanate (2,6-TDI). The polyisocyanates useful as starting components for the preparation of the polyisocyanate prepolymers also include cycloaliphatic diisocyanates with trans or trans,trans geometric configuration. These isomers are generally pure, i.e., they exist in the substantial absence of cis-configured isomers, and thus promote good phase separation once cured. These include but are not limited to t-CHDI, and trans,trans-4,4'-dicyclohexylmethyl diisocyanate (t,t-HMDI).

The polyols useful in the polyisocyanate prepolymers are nonoxidative up to 150° C., and include but are not limited to polyester polyols and polycarbonate polyols. Polyether polyols are not suitable for the present invention since they are extremely susceptible to oxidation at 150° C. Polythioether polyols are not suitable for the present invention since they give rise to elastomers susceptible to macroradical coupling, and are therefore brittle at 150° C. This is due to the presence of methylene protons adjacent to sulfur atoms, which undergo massive hydrogen abstractions at 150° C. and induce coupling between two polythioether soft segments.

The polyester polyols used in the present invention include but are not limited to reaction products of polyhydric alcohols, preferably dihydric alcohols with the addition of some trihydric alcohol, and/or polybasic carboxylic acids, preferably dibasic carboxylic acids with the addition of some tribasic carboxylic acids. The corresponding polycarboxylic acid anhydrides or corresponding polycarboxylic acid esters of lower alcohols or mixtures thereof are preferred over their free polycarboxylic acid counterparts for preparing the polyesters. The polycarboxylic acids may be aliphatic, cycloaliphatic, and/or aromatic in nature. The following are mentioned as non-limiting examples: succinic acid, adipic acid, suberic acid, azelaic acid, sebasic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, endomethylene tetrahydrophthalic acid anhydride, glutaric acid anhydride, fumaric acid, dimeric and trimeric fatty acids, optionally mixed with monomeric fatty acids, dimethylterephthalate and terephthalic acid-bis-glycol esters. Suitable polyhydric alcohols used to produce such polyesters include but are not limited to the following; ethylene glycol, 1,2- and 1,3-propylene glycol, 1,4- and 2,3-butylene glycol, 1,6-hexanediol, 1,8-octanediol, 1,10-decanediol, neopentyl glycol, 1,4-cyclohexane dimethanol or 1,4-bis-hydroxymethylcyclohexane, 2-methyl-1,3-propanediol, glycerol, trimethylopropane ("TMP"), 1,2,6-hexanetriol, 1,2,4-butanetriol, trimethylolethane, and mixtures thereof. Polyesters of lactones, such as ε-caprolactone, and hydroxycarboxylic acids, such as .omega.-hydroxycaproic acid, may also be used.

Suitable polycarbonate polyols are known and may be prepared, for example, by the reaction of diols, such as 1,3-propanediol, 1,4-butanediol, 1,6-hexanediol, 1,10-decanediol, neopentyl glycol, diethylene glycol, triethylene glycol or tetraethylene glycol, and mixtures thereof, with diaryl carbonates, e.g. diphenyl carbonate, dialkyl carbonate, e.g. diethyl carbonate, or phosgene.

The preferred polyols are polycarbonate polyols and polyester polyols with molecular weights from about 500 to about 4000 or 5000, or mixtures of these polyols. The more preferred polyols are poly(hexamethylene carbonate) ("PCB") diol and/or triol, polycaprolactone ("PCL") diol and/or triol, and poly(hexamethylene adipate) diol and/or triol with molecular weights from about 300 or 500 to about 4000 or 5000. The most preferred polyols are poly(hexamethylene carbonate) diol and/or triol, polycaprolactone diol and/or triol, and/or poly(hexamethylene adipate) diol and/or triol. The most preferred molecular weights for diols range from about 1500 to about 2500 and for triols range from about 1000 to about 4000, or from about 2500 to about 3500. The polyols are dried to a moisture level of less than about 0.03% by weight, and more preferably, to a level of about 0.0150% by weight prior to reaction with the diisocyanates to form the polyisocyanate prepolymers useful for this invention. The polyol used to prepare the prepolymer is a mixture of at least one triol selected from the above polyols and one or more other polyols, preferably diols. The most preferred diols and triols are the most preferred polyols listed above. The amount of triol crosslinker in the polyol mixture is not particularly limited since it is possible to use anywhere from about 2% up to 100% triol. Nevertheless in preferred embodiments, the amount of triol in the polyol mixture may preferably be from 5% up to about 35% by weight of the total polyol component of the prepolymer, more preferably from about 15% to about 25%. The remainder of the polyol mixture may be diol. Too little triol leads to insufficient crosslinking and little or no improvement in high temperature performance, while too much triol leads to processing or mixing difficulties from the increase in viscosity of the prepolymer and/or lack of wetting or penetration of textile reinforcement by the polyurethane and/or chemical instability of the mixture.

In embodiments of the invention, the prepolymer may be prepared by mixing a diol-based prepolymer with a triol-based prepolymer. However, the increased viscosity of triol-based prepolymers makes this difficult. Thus, the preferred embodiment is a prepolymer prepared from the mixed diol and triol.

The use of diamine chain extenders, while typically more difficult to process than diol chain extenders due to their higher melting points, contribute greater thermal stability via urea linkages which are more stable than their urethane counterparts. The preferred diamine chain extenders useful in the present invention possess the following three characteristics: symmetric structure for improved phase separation of the resulting elastomers; non-bulky substitute groups on the aromatic rings if such groups are present in order that hard segment crystallization and overall phase separation of the resulting elastomers is not retarded; and proper reactivity with isocyanate group thus eliminating the need for catalysts in the formulations. Primary diamine chain extenders are used for proper reactivity.

The symmetric primary diamine chain extenders useful in the present invention are those capable of reacting with polyisocyanate prepolymers rapidly without the need for catalysts. In addition, these chain extenders must uniquely contribute to the excellent dynamic performance of the resulting elastomers of the present invention. The symmetry of the chain extenders useful in the present invention provides improved phase separation and hence increases the thermal stability of the final polyurethane/urea elastomers in dynamic applications. Suitable primary diamine chain extenders include but are not limited to symmetric aromatic amines with molecular weights of from about 90 to about 500, and mixtures thereof. Examples include: 1,4-phenylenediamine, 2,6-diaminotoluene, 1,5-naphthalenediamine, 4,4'-diaminodiphenyl methane, 3,3'-dimethyl-4,4'-diaminodiphenyl methane, 1-methyl-3,5-bis(methylthio)-2,6-diaminobenzene, 1-methyl-3,5-diethyl-2,6-diaminobenzene, 4,4'-methylene-bis-(3-chloro-2,6-diethylaniline) ("MCDEA"), 4,4'-methylene-bis-(ortho-chloroaniline), 4,4'-methylene-bis-(2,3-dichloroaniline), trimethylene glycol di-para-aminobenzoate, 4,4'-methylene-bis-(2,6-diethylaniline), 4,4'-methylene-bis-(2,6-diisopropylaniline), 4,4'-methylene-bis-(2-methyl-6-isopropylaniline), 4,4'-diamino diphenyl sulfone, and the like.

The symmetric aromatic primary diamine chain extenders may optionally be combined with up to about 25% secondary diamine chain extenders in order to vary elastomer characteristics such as hardness. Suitable examples of aromatic secondary diamine chain extenders have molecular weights of from about 150 to about 500, and include but are not limited to N,N'-di-sec-butyl-amino benzene and N,N'-di-sec-butyl-amino-diphenylmethane.

The symmetric aromatic primary diamine chain extenders may also be combined with one or more of the polyols described above and contained in the prepolymer, in order to alter process and product characteristics such as mixing ratio, processing temperature, flexibility, etc. These long chain polyols do not act as chain extenders, but reduce the amount of hard segment in the elastomer, thus reducing it's hardness. This may be desirable for some applications. Suitable weight ratios of polyol to symmetric primary diamine chain extender may be from about 30:70 to about 60:40, and is more preferably from about 40:60 to about 50:50.

Neither aliphatic nor aromatic short chain hydroxyl compounds are suitable as chain extenders for the present invention due to the instability of urethane linkages in the resulting elastomers at high temperatures, and their inadequate dynamic properties in applications at high temperatures.

The preparation of polyisocyanate prepolymers through reaction of a polyisocyanate and a polyol or polyol mixture is well known to the art. The general criteria for choosing the order of addition is that which will minimize the amount of oligomers, which otherwise induce processing difficulties in the form of high prepolymer viscosity. Other factors must also be considered in choosing the order of addition for preparing polyisocyanate prepolymers. It is known, for example, that if the polyol component is added into liquid PPDI at a temperature above its melting point of 95° C., a high degree of dimerization and sublimation of PPDI takes place. In the Examples that follow, all of the polyols were added to the polyisocyanates, except for in the PPDI-based prepolymer synthesis, in which PPDI was added to the polyol. If required, a small amount of stabilizer, such as benzoyl chloride, may be added into the polyisocyanate prepolymer during its preparation stage. A preferred mixing ratio of polyisocyanate to polyol expressed as a stoichiometric ratio of NCO/OH is from about 1.8:1 to about 2.4:1, and, for prepolymers based on PPDI, is more preferably about 2:1, and for prepolymers based on t,t-HMDI, is more preferably about 2.2:1. The reaction of the diisocyanate and polyol is carried out preferably from about 3 hours to about 10 hours, more preferably from about 5 to about 6 hours. The polyisocyanate prepolymers useful in the present invention include an isocyanate group content of approximately 2 to 12 weight percent NCO, more preferably 3 to 7 weight percent NCO, and most preferably 3.4 to 4.0 weight percent NCO.

Since addition of plasticizer may dramatically soften the resulting polyurethane, even with the presence of the triol crosslinker in the prepolymer, the percent NCO may be advantageously increased up to about 6.0 weight percent to compensate.

The polyisocyanate prepolymers of the present invention may be reacted via standard molding processes with a chain extender as known in the polyurethane/urea art. The polyurethane/urea elastomers of the present invention utilize an isocyanate to amine or amine/hydroxyl equivalent ratio of from about 0.95:1 to about 1.2:1, and more preferably, from about 1.05:1 to about 1.1:1.

The polyurethane/urea elastomers of the present invention may be mixed with additives such as pigments, colorants, antistatic agents, etc., at a suitable stage of belt fabrication.

Examples ("Ex.") according to embodiments of the invention were prepared to illustrate the benefits of the invention relative to comparative examples ("Comp. Ex."). The basic formulations are shown in Table 1. In the tables, PCL is polycaprolactone and PCB is polycarbonate. Table 1 also shows the other components of example and comparative example belts made from the polyurethane formulations. The belt embodiments included tensile cord of carbon fiber and tooth fabric of nylon-66 woven fabric laminated with polyethylene film on the external tooth surface.

gives the material strength and stiffness to the soft segment where the plasticizer resides. Thus, tensile strength dropped with the addition of plasticizer as measured in tensile tests at 150° C. Addition of triol crosslinker to the diol also caused the ultimate tensile strength at 150° C. to drop along with a dramatic decrease in elongation at break at 150° C. Addition of plasticizer to the prepolymer slightly lowered the modulus of both diol and mixed diol-triol elastomers. These negative effects on the stress-strain behavior of the elastomer can be seen in the stress-strain curves of FIG. 4. This loss of tensile strength and modulus and increase in elongation at break, which are generally known and observed in plasticized polyurethanes and specifically observed in Ex. 4 and Ex. 5, combined with the dramatic decrease in elongation at break due to the triol crosslinker suggested that the plasticized formulations of the invention would not perform well in demanding, dynamically loaded, flexing conditions. In addition, some plasticizers were evaluated that separated from the reaction mixture or bloomed to the surface of the elastomer, e.g. tri-isononyl trimellitate sold under the reference Jayflex TIN™ by Exxon Mobile Corporation. Other plasticizers which were evaluated, such as various phthalate plasticizers, volatilized too rapidly during hot air aging of elastomer samples in a

TABLE 1

| | Example | | | | |
|---|---|---|---|---|---|
| | Comp. Ex. 1 | Comp. Ex. 2 | Comp. Ex. 3 | Ex. 4 | Ex. 5 |
| Tensile Member | Carbon | Carbon | Carbon | Carbon | Carbon |
| Wear Resistant Tooth Covering | Woven Nylon Laminate | Woven Nylon Laminate | Woven Nylon Laminate | Woven Nylon Laminate | Woven Nylon Laminate |
| Polyol 1 | PCL diol | PCL diol | PCL diol | PCL diol | PCL diol |
| Polyol 2 | None | None | PCL triol | PCL triol | PCL triol |
| Diisocyanate | PPDI | PPDI | PPDI | PPDI | PPDI |
| Plasticizer | None | Tegmer 809 | None | Tegmer 809 | Tegmer 809 |
| Wt. % Plasticizer. | 0 | 13.1 | 0 | 8.7 | 13.2 |
| Chain Extender | MCDEA | MCDEA | MCDEA | MCDEA | MCDEA |
| NCO (%) | 3.8 | 3.5 | 3.6 | 3.2 | 3.0 |
| BF Viscosity (Poise w/ LV#5 @ 100 rpm & 65° C.) | 26.9 | 11.5 | 32 | 19.2 | 14.1 |
| Pot Life (s) | | | 70 | 80 | 90 |

Table 1 also shows some processing properties of the Ex. and Comp. Ex. elastomer formulations. Prepolymer viscosity decreases with the addition of plasticizer, as determined by Brookfield ("BF") viscometry with LV#5 spindle at 100 rpm and 65° C. The % NCO also decreases with the addition of plasticizer as determined by amine titration techniques. For example, comparing Comp. Ex. 1 and 2 shows that adding 13.1% plasticizer to the PCL diol based prepolymer reduced the % NCO from 3.8% to 3.5% and the viscosity from 26.9 to 11.5 Poise. Comparing Comp. Ex. 1 and 3 shows that adding branched PCL triol to the linear PCL diol increased the viscosity of the prepolymer from 26.9 to 32 Poise. Comparing Comp. Ex. 3, Ex. 4, and Ex. 5 shows that adding increasing amounts of plasticizer to the blended PCL diol and triol lowers both the viscosity and % NCO. The lower % NCO contributes to an increase in pot life from 70, to 80, to 90 seconds for Comp. Exp. 3, Ex. 4, and Ex. 5, respectively.

Figure 4:
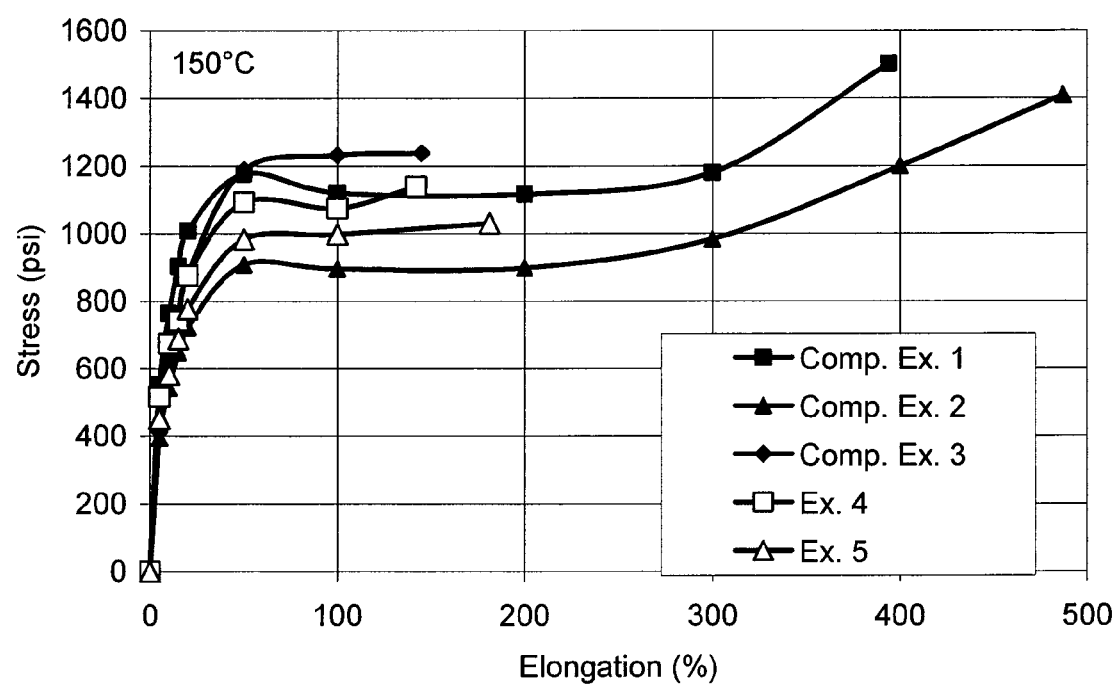
FIG. 4 is a graph of hot stress-strain data of polyurethane/urea elastomer compositions according to embodiments of the invention and comparative compositions.

The addition of either triol or plasticizer alone to the prepolymer reduced a number of physical properties in the elastomers formed from them, as illustrated by the data in Table 2 and FIG. 4. For example, density was reduced from 1.15 to 1.14 g/cc for the Comp. Ex. 1 and 2, and from 1.15 to 1.13 g/cc for Comp. Ex. 3, Ex. 4 and Ex. 5. The density decrease indicates a reduction in the ratio of the hard segment which forced air oven at 150° C. The preferred plasticizer for embodiments of the present invention, Tegmer 809, did not separate from the reaction mixture or bloom to the surface of the elastomer. Tegmer 809 did not volatilize after hot air aging of elastomer samples in a forced air oven at 150° C. for 2000 hours. Thus, polyethylene glycol di-alkylester plasticizers, such as Tegmer 809, were considered the only, albeit unlikely, candidate plasticizers for further testing in belt embodiments of the present invention, in view of the changes in physical properties observed from addition of this plasticizer to polyurethane/urea elastomers.

TABLE 2

| | Elastomer Example | | | | |
|---|---|---|---|---|---|
| | Comp. Ex. 1 | Comp. Ex. 2 | Comp. Ex. 3 | Ex. 4 | Ex. 5 |
| Density (g/cc) | 1.15 | 1.13 | 1.15 | 1.14 | 1.13 |
| Heat Aging Weight Loss at 150° C. for 2000 hrs (%) | 1.7 | 5.4 | | 3.6 | 5.3 |
| Polymer Ultimate Tensile Strength at 150° C. | 1502 | 1409 | 1239 | 1139 | 1031 |

TABLE 2-continued

| | Elastomer Example | | | | |
|---|---|---|---|---|---|
| | Comp. Ex. 1 | Comp. Ex. 2 | Comp. Ex. 3 | Ex. 4 | Ex. 5 |
| Polymer Ultimate Tensile Elongation at 150° C. | 394 | 497 | 145 | 142 | 181 |

The example polyurethane/urea elastomer formulations of Table 1 were made into toothed power transmission belts according to embodiments of the invention. Comparative belts were made in the same way. A cylindrical mandrel with grooves was used to form the toothed belts with a desired number of curvilinear teeth of 9.525-mm tooth spacing. A sheet of laminated fabric cut to fit the face width of the mandrel and thermally preformed to follow the contours of the grooved mandrel surface was applied around the mandrel. Then a balanced pair of S and Z twisted 12 k yarn of carbon fiber was helically wound onto the fabric covered mandrel. The mandrel was then placed into a shell and the polyurethane formulation injected into the cavity between mandrel and shell, pressurized at about 300 to 400 psi and allowed to cure. After demolding the resulting slab may be post cured for a day or so at from about 100 to 150° C., then cut into individual belts for dynamic testing.

Figure 5:
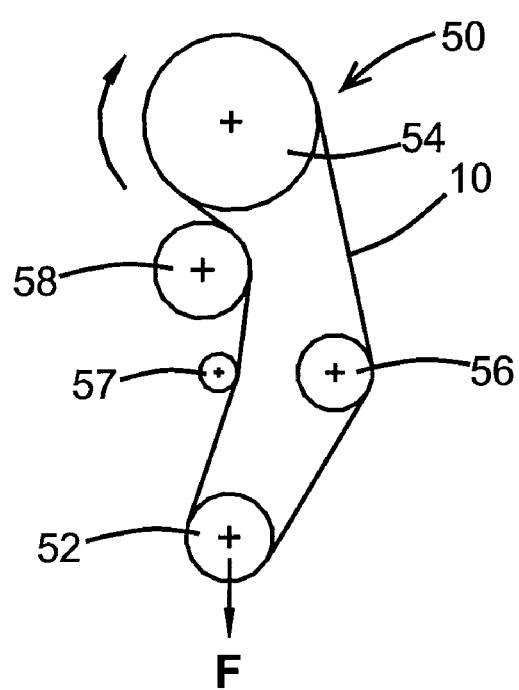
FIG. 5 is a schematic of a RTFF test rig used for evaluating a characteristic of a belt embodiment of the invention.

Three dynamic belt tests were conducted to evaluate performance characteristics of embodiments of the invention under various conditions. The Room Temperature Flex Fatigue ("RTFF") test was conducted on a deadweight-tensioned, motor-driven rig with the pulley configuration illustrated in FIG. 5. Referring to FIG. 5, the RTFF test 50 included training a 12.7-mm (½-inch) wide, 120-tooth belt 10 about 44-tooth driver pulley 54, 19-tooth intermediate pulley 56, and 22-tooth driven pulley 52, with 72-mm and 28-mm backside idlers 58 and 57 respectively. Deadweight F of 2224 N was applied at driven pulley 52, which was driven at 7000 rpm. After 200 hours of running at room temperature, test belt 10 was removed for whole-belt tensile strength testing. The percent retained tensile strength is reported in Table 3 as an average of two or more belts, thus indicating the room temperature flex fatigue resistance of the belt construction.

Figure 6:
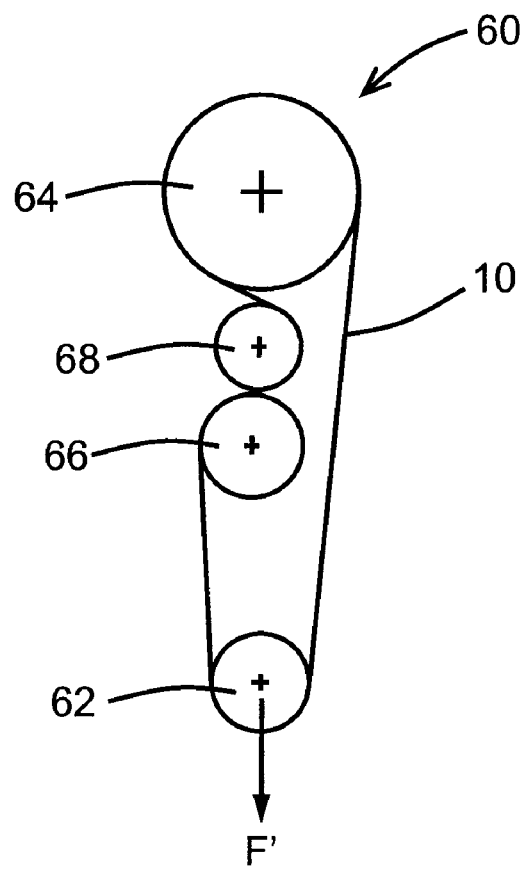
FIG. 6 is a schematic of a HTFF test rig used for evaluating a characteristic of a belt embodiment of the invention.

The High Temperature Flex Fatigue ("HTFF") test was conducted on a deadweight-tensioned, motor-driven rig with the pulley configuration illustrated in FIG. 6. Referring to FIG. 6, the HTFF test 60 included training a 19.1-mm (¾-inch) wide, 97-tooth belt 10 about 19-tooth driver pulley 62, 20-tooth intermediate pulley 66, and 38-tooth driven pulley 64, with 55-mm backside idler 68. Deadweight F' of 490 N was applied at driver pulley 62. Driven pulley 64 was driven at 3500 rpm. A hot box maintained an ambient temperature of 145° C., and the test was stopped when belt 10 failed. The belt life in hours is reported in Table 3 as an average of two or more belts, thus indicating the high temperature flex fatigue resistance of the belt construction.

The Hot Durability ("HD") test was conducted on a locked-center, two-point, motor-driven test rig. The HD test included training a 12.7-mm (½-inch) wide, 120-tooth belt about a 34-tooth driver pulley and a 34-tooth driven pulley which was driven at 2000 rpm and provided a 13.5 kW (20 hp) load. A hot box maintained an ambient temperature of 140° C., and the test was stopped when the belt failed. The belt life in hours is reported in Table 3 as an average of two or more belts, thus indicating the high temperature durability or composite integrity of the belt construction.

The belt test results of Table 3 indicate that embodiments of the invention exhibit both improved flex fatigue resistant at room and high temperatures, and improved durability or composite integrity at high temperatures, even though some elastomer properties in Table 2 were decreased relative to comparative examples. For Comp. Ex. 1 and 3, more than half the tensile strength of the belt was lost after 200 hours on the RTFF test rig. In contract, inventive Ex. 4 and 5 retained 92% and 82% of the original tensile strength, respectively.

The results of Comp. Ex. 3 versus Comp. Ex. 1 show that adding PCL triol to the PCL diol prepolymer significantly improved hot flex fatigue resistance and hot durability or composite integrity of the comparative belt. This can be seen in the results of HTFF testing at 145° C. and HD testing at 140° C. However, adding plasticizer along with PCL triol according to embodiments of the invention improved hot durability even more than adding triol alone. The modulus and strength of the urethane are lowered slightly by the addition of plasticizer, which may account for the slightly lower results on HTFF testing than for Comp. Ex. 3. It is also noteworthy that the inventive Ex. 4 and 5 belts exhibited predominantly tooth shear failure on the two belt life tests, a more favorable failure mode than the delamination typically exhibited by the Comp. Ex. 1 belts.

Without wishing to be bound thereby, some ideas on the mechanism of the observed urethane belt performance improvement by addition of plasticizer with triol crosslinking may be offered. Two mechanisms may be cooperating: one mechanism may improve processing and interactions between elastomer and textile reinforcement, and another may improve certain elastomer properties. Plasticizer added according to embodiments of the invention results in lower viscosity and longer pot life, which means improved urethane processing properties. In particular, the belt mold can be filled faster and the resin remains liquid longer, both of which may contribute to better wetting of the reinforcing textiles present by the liquid urethane. Improved textile wetting may lead to better cord tensile retention on RTFF testing. High modulus tensile cords, like carbon and aramid, are sensitive to bending and crimp damage. Surrounding the fibers of the cord with elastomer through improved wetting may help redistribute local bending forces and extend the life of the tensile cord. As for the elastomer properties per se, it is probably important that the plasticizer be highly compatible with the soft segment polyols used in the prepolymer, and not compatible with the hard segment crystalline regions of chain extender. Thus, the plasticizer does not bloom, but neither does it interfere with physically crosslinked or crystalline domains in the polyurethane. At the same time triol crosslinking in the soft segments is also probably necessary for the excellent high temperature integrity of the urethane elastomer and the composite. Soft segment crosslinking may reduce the ability of the hard segments to yield and reorient or reform under stress. Note the presence of yielding or strain hardening in the uncrosslinked Comp. Ex. 1 and 2. This behavior is minimized in the crosslinked versions Comp. Ex. 3, Ex. 4, and Ex. 5. Also supporting this idea is the fact that the stress at which the yield point is reached is higher in the crosslinked samples than in the uncrosslinked samples at the same level of plasticization. Thus, the polyurethane segmented molecular morphology may be subtly improved by plasticizer with crosslinking.

TABLE 3

| | Belt Example | | | | |
|---|---|---|---|---|---|
| | Comp. Ex. 1 | Comp. Ex. 2 | Comp. Ex. 3 | Ex. 4 | Ex. 5 |
| RTFF Test (% Retained Tensile strength at 200 hours) | 47 | | 44 | 92 | 82 |
| HTFF Test (life in hours at 145° C.) | 24 | 35 | 588 | 408 | 350 |
| Hot Durability Test (life in hours at 140° C.) | 57 | 20 | 171 | 296 | 279 |

While the above examples focus on toothed belts, it should recognized that the polyurethane/urea of the present invention may also provide similar benefits if utilized in other textile reinforced articles subject to dynamic stresses, such as V-belts, multi-V-ribbed belts, flat belts, flexible sleeve couplings, hose, and the like.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A power transmission belt comprising a main belt body portion of elastomeric material, a tensile reinforcement disposed in said body portion, and a sheave contact portion integral with said main body portion, said elastomeric material comprising the reaction product of:
   (A) a polyisocyanate prepolymer composition prepared by reacting
      (i) a diisocyanate selected from the group consisting of
         (a) para-phenylene diisocyanate,
         (b) 2,6-toluene diisocyanate, and
         (c) a cycloaliphatic diisocyanates with trans or trans, trans geometric structure;
      (ii) a polyol substantially free of moieties oxidative at less than about 150° C. and selected from the group consisting of
         (a) polycarbonate polyols,
         (b) polyester polyols, and
         (c) mixtures of said polycarbonate polyols and said polyester polyols; and
      (iii) a triol crosslinker selected from said polyols; and adding there to
      (iv) a plasticizer selected from the group consisting of alkyl-ether di-alkylesters, polyalkyl-ether di-alkylesters, and polyethylene glycol di-alkylesters; and
   (B) a chain extender selected from the group consisting of (a) aromatic symmetric primary diamine chain extenders, (b) mixtures of said aromatic symmetric primary diamine chain extenders and aromatic secondary diamine chain extenders, and (c) mixtures of one or more of said aromatic symmetric primary diamine chain extenders and said polyols.

2. The power transmission belt of claim 1 wherein said tensile reinforcement comprises carbon fiber.

3. The power transmission belt of claim 2 wherein said carbon fiber is in the form of a cord of a yarn of carbon fibers with interstices between the fibers and with belt material penetrating at least a portion of the cord interstices.

4. The power transmission belt of claim 3 further comprising belt teeth formed of the body and spaced apart at a pitch and a wear-resistant fabric reinforcement disposed along peripheral surfaces of the belt teeth.

5. The power transmission belt of claim 1 wherein said plasticizer is selected from the group consisting of polyethylene glycol di-2-ethylhexoates having a molecular weight of from about 300 to about 700.

6. A power transmission belt comprising a main belt body portion of polyurethane/urea elastomer, a tensile reinforcement comprising carbon fiber disposed in said body portion, and a sheave contact portion integral with said main body portion, said polyurethane/urea elastomer comprising the reaction product of:
   (A) a polyisocyanate prepolymer composition prepared by reacting
      (i) a diisocyanate selected from the group consisting of
         (a) para-phenylene diisocyanate, (b) 2,6-toluene diisocyanate, and (c) a cycloaliphatic diisocyanates with trans or trans, trans geometric structure;
      (ii) a polyol substantially free of moieties oxidative at less than about 150° C. and selected from the group consisting of (a) polycarbonate polyols, (b) polyester polyols, and (c) mixtures of said polycarbonate polyols and said polyester polyols; and
      (iii) a triol crosslinker selected from said polyols; and adding there to
      (iv) a plasticizer selected from the group consisting of alkyl-ether di-alkylesters, polyalkyl-ether di-alkylesters, polyethylene glycol di-alkylesters; and
   (B) a chain extender selected from the group consisting of (a) aromatic symmetric primary diamine chain extenders, (b) mixtures of said aromatic symmetric primary diamine chain extenders and aromatic secondary diamine chain extenders, and (c) mixtures of one or more of said aromatic symmetric primary diamine chain extenders and said polyols;
   said polyurethane/urea elastomer having an isocyanate to amine or amine/hydroxyl equivalent ratio of from about 0.95:1 to about 1.20:1, and said polyisocyanate prepolymer composition having an isocyanate group content of from about 2% to about 12% by weight.

7. The power transmission belt of claim 6 wherein said polyester polyol is a mixture of polycaprolactone diol and polycaprolactone triol each of which has a molecular weight in the range of from about 300 to about 4000.

8. The power transmission belt of claim 7 wherein said polycaprolactone diol has molecular weight of from about 1500 to about 2500 and said polycaprolactone triol has molecular weight of from about 1000 to about 4000.

9. The power transmission belt of claim 6 wherein said polyester polyol is poly(hexamethylene adipate) diol or triol having molecular weight of from about 500 to about 4000.

10. The power transmission belt of claim 7 wherein said plasticizer is polyethylene glycol di-2-ethylhexoate having molecular weight of from about 300 to about 700.

11. The power transmission belt of claim 6 wherein said triol makes up from 5% to about 35% by weight of the polyol in the prepolymer, and said plasticizer makes up from 5% to about 15% by weight of said prepolymer.

12. A article subject to dynamic loading in use selected from the group consisting of a belt, belting, a flexible coupling sleeve, and a hose comprising a polyurethane/urea elastomer as its primary elastomeric composition and a fibrous textile reinforcement selected from a tensile cord, a woven fabric, and a non-woven fabric; said reinforcement having interstices between fibers which are substantially filled with said elastomer; said elastomer comprising the reaction product of:
(A) a polyisocyanate prepolymer composition prepared by reacting
  (i) a diisocyanate selected from the group consisting of
    (a) para-phenylene diisocyanate,
    (b) 2,6-toluene diisocyanate, and
    (c) a cycloaliphatic diisocyanates with trans or trans, trans geometric structure;
  (ii) a polyol substantially free of moieties oxidative at less than about 150° C. and selected from the group consisting of
    (a) polycarbonate polyols,
    (b) polyester polyols, and
    (c) mixtures of said polycarbonate polyols and said polyester polyols; and
  (iii) a triol crosslinker selected from said polyols; and adding there to
  (iv) a plasticizer selected from the group consisting of alkyl-ether di-alkylesters, polyalkyl-ether di-alkylesters, and polyethylene glycol di-alkylesters; and
(B) a chain extender selected from the group consisting of
  (a) aromatic symmetric primary diamine chain extenders, (b) mixtures of said aromatic symmetric primary diamine chain extenders and aromatic secondary diamine chain extenders, and (c) mixtures of one or more of said aromatic symmetric primary diamine chain extenders and said polyols;
  wherein said triol makes up from 5% to about 35% by weight of the polyol in the prepolymer, and said plasticizer makes up from 5% to about 15% by weight of said prepolymer.

13. The article of claim 12 wherein the plasticizer is polyethylene glycol di-2-ethylhexoate having molecular weight of from about 300 to about 700.

14. The article of claim 12 wherein the plasticizer is polyethylene glycol 400 di-2-ethylhexoate.

15. A method comprising:
(A) reacting (i) a diisocyanate selected from the group consisting of
  (a) para-phenylene diisocyanate,
  (b) 2,6-toluene diisocyanate, and
  (c) a cycloaliphatic diisocyanates with trans or trans, trans geometric structure;
(ii) a polyol substantially free of moieties oxidative at less than about 150° C. and selected from the group consisting of
  (a) polycarbonate polyols,
  (b) polyester polyols, and
  (c) mixtures of said polycarbonate polyols and said polyester polyols; and
(iii) a triol crosslinker selected from said polyols; to form a polyisocyanate prepolymer composition;
(B) adding to said prepolymer before or after said reacting a plasticizer selected from the group consisting of alkyl-ether di-alkylesters, polyalkyl-ether di-alkylesters, and polyethylene glycol di-alkylesters;
(C) adding a chain extender selected from the group consisting of (a) aromatic symmetric primary diamine chain extenders, (b) mixtures of said aromatic symmetric primary diamine chain extenders and aromatic secondary diamine chain extenders, and (c) mixtures of one or more of said aromatic symmetric primary diamine chain extenders and said polyols; to form a reactive urethane;
(D) molding an article subject to dynamic loading in use selected from the group consisting of a belt, belting, a flexible coupling sleeve, and a hose;
(E) embedding in or on a surface of said article a textile reinforcement having interstices between fibers thereof, with said reactive urethane penetrating at least some of said interstices before or during said molding.

16. The method of claim 15 wherein the plasticizer is polyethylene glycol di-2-ethylhexoate having molecular weight of from about 300 to about 700.

17. The method of claim 16 wherein said triol makes up from 5% to about 35% by weight of the polyol in the prepolymer, and said plasticizer makes up from 5% to about 15% by weight of said prepolymer.

18. The method of claim 17 wherein said polyester polyol is a mixture of polycaprolactone diol and polycaprolactone triol each of which has a molecular weight in the range of from about 300 to about 4000.

19. The method of claim 18 wherein said polycaprolactone diol has molecular weight of from about 1500 to about 2500 and said polycaprolactone triol has molecular weight of from about 1000 to about 4000.

* * * * *